United States Patent
Hendrix et al.

[11] Patent Number: 5,346,620
[45] Date of Patent: Sep. 13, 1994

[54] PROCESS FOR WASTE WATER TREATMENT BY REMOVAL OF SODIUM SULFATE

[75] Inventors: David C. Hendrix; Andrew J. McNabb, both of Lake Jackson; Nguyen L. Kim, Clute; Michael Loden, Lubbock; Jaime R. Morales, Sugarland, all of Tex.

[73] Assignee: BASF Corporation, Parsippany, N.J.

[21] Appl. No.: 114,701

[22] Filed: Aug. 31, 1993

[51] Int. Cl.⁵ .......................... B01D 9/02; C02C 3/30
[52] U.S. Cl. ................................... 210/605; 210/631; 210/642; 210/903
[58] Field of Search ............... 210/605, 620, 630, 631, 210/642, 729, 806, 737, 903

[56] References Cited

U.S. PATENT DOCUMENTS

| | | | |
|---|---|---|---|
| 3,177,139 | 4/1965 | Kimberlin, Jr. et al. | 210/642 |
| 3,234,125 | 2/1966 | Bloch | 210/642 |
| 3,239,459 | 3/1966 | Patterson | 210/642 |
| 3,867,537 | 4/1975 | Dulin et al. | 210/620 |
| 4,261,818 | 4/1981 | Sweeney | 210/642 |
| 4,430,227 | 2/1984 | Hanson et al. | 210/642 |
| 4,483,740 | 11/1984 | Parkinson et al. | 159/47.3 |
| 4,595,508 | 6/1986 | Wolfe et al. | 210/631 |
| 4,632,760 | 12/1986 | Hanson et al. | 210/642 |
| 4,879,042 | 11/1989 | Hanson et al. | 210/642 |

FOREIGN PATENT DOCUMENTS 1562459 2/1968 France .

*Primary Examiner*—Christopher Upton
*Attorney, Agent, or Firm*—Karen M. Dellerman

[57] ABSTRACT

The present invention is a process for treatment of waste water streams having a sodium sulfate content of above 20 percent. The process is useful for treating waste water generated in the production of polyethyleneimine and cyclohexanone. The process includes the steps of removing sodium sulfate from waste water by the addition of organic solvent. The waste water having reduced sodium sulfate content is then subjected to biological treatment with activated sludge. First the waste water is subjected to pre-treatment. Pre-treated waste water is combined other waste water and treated by denitrification and nitrification.

16 Claims, 2 Drawing Sheets

PROCESS FOR WASTE WATER TREATMENT BY REMOVAL OF SODIUM SULFATE

FIELD OF THE INVENTION

The present invention relates to the field of waste water treatment. More specifically, the invention relates to a waste water treatment process including the removal of sodium sulfate from a waste water stream and biological treatment of waste water.

BACKGROUND OF THE INVENTION

Waste water resulting from the production of polyethyleneimine production and cyclohexanone production contain high concentrations of ammonia, organic carbon, oligomers and sodium sulfate and are unusually resistant to two sludge waste water treatment processes. A two sludge treatment system includes a denitrification step and a nitrification step. Denitrification removes carbon from waste water with the use of carbon metabolizing bacteria. Nitrification is the removal of ammonia from the waste water by bacterial oxidation of ammonia to nitrate ($NO_3^-$). Nitrification is carried out by a limited number of bacterial species and under restricted conditions, including a narrow range of pH and temperature. Nitrifying bacteria grow slowly and nitrogen oxidation is energy poor in relation to carbon oxidation. In addition, nitrification is inhibited by the presence of a large number of compounds, including ammonia and nitrite ion ($NO_2^-$). Also, nitrifying bacteria subsist only under aerobic conditions and require inorganic carbon ($CO_3^-$) for growth.

The nitrification process met with recurring failure. Failure is exhibited by the change from nearly complete ammonia removal where no polyethyleneimine waste is present in the waste water, to essentially no ammonia removal, where 6 percent polyethyleneimine waste is present in the waste water, within a period of 48 hours.

The present invention is identification of the factors causing the failure of the polyethyleneimine waste water treatment process and development of a process to treat the waste water.

It was found that biological pre-treatment of the polyethyleneimine waste stream, in order to reduce the inhibitory effect of the polyethyleneimine waste water on the nitrification process, is not feasible since the high content of sodium sulfate in the stream prevents biological activity.

To solve this problem a waste water treatment process including removal of sodium sulfate from the waste water in conjunction with biological pre-treatment, denitrification and nitrification was devised.

SUMMARY OF THE INVENTION

The present invention is a process for treatment of waste water streams generated from production of polyethyleneimine and cyclohexanone, including the steps of removing sodium sulfate from plant waste water and biological pre-treatment, followed by denitrification and nitrification.

In the present invention, the sodium sulfate is separated from the waste stream in the form of crystals, by the addition of organic solvent, wherein said solvent is miscible with water at temperatures between 20° C. and 100° C. Methanol, ethanol, isopropyl alcohol and monoethanolamine are suitable solvents for this purpose. Following the addition of solvent, sodium sulfate is removed by filtration. The organic solvent may optionally be removed by distillation and reused in the process. The waste water stream, then at a reduced concentration of sodium sulfate, can be pre-treated in a biological process.

The biological pre-treatment process includes bacterial treatment with activated sludge containing carbon metabolizing bacteria to reduce Total Organic Carbon (TOC) content of the waste water. The pre-treated waste water is then blended with other waste waters for denitrification and nitrification treatment steps. The denitrification step is treatment of waste water with activated sludge containing carbon metabolizing bacteria. The nitrification step is treatment of the waste water with activated sludge containing nitrogen metabolizing bacteria.

This process significantly reduces the TOC content in waste water generated from the production of polyethyleneimine and cyclohexanone prior to its addition to the main waste water stream, shortens overall nitrification time and provides lower ammonia and TOC content in the final treated effluent.

IN THE DRAWINGS

DETAILED DESCRIPTION OF THE INVENTION

Figure 1:
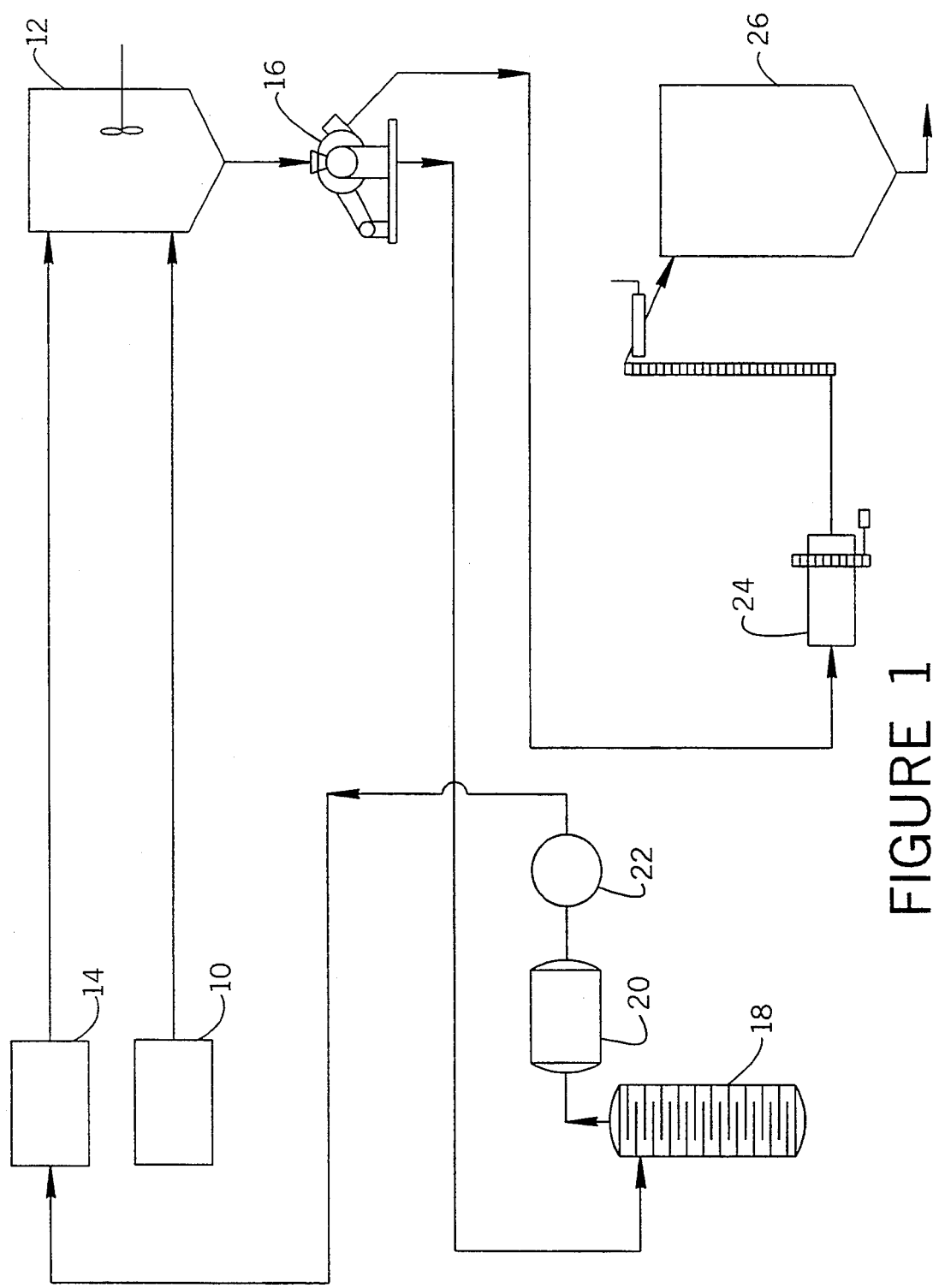
FIG. 1 illustrates sodium sulfate recovery from plant waste water.

The present invention is a process for treatment of waste water streams using an activated biological sludge. The process is particularly useful for waste water streams generated in the production of polyethyleneimine and cyclohexanone. Such waste water may contain high concentrations of ammonia or organic amines, sodium sulfate in concentrations above 20%, and high organic carbon content. The high sodium sulfate concentration has been found to inhibit known methods of bacterial treatment to remove TOC from waste water. The present invention is a process for treating waste water to successfully reduce the ammonia and TOC content of final waste water effluent, without the need for extended residence time.

The process of treating waste water according to the present invention includes the steps of removing sodium sulfate from waste water generated in the production of polyethyleneimine and cyclohexanone to improve bacterial activity, also referred to as biologic activity. Following sodium sulfate removal, bacterial pre-treatment is employed, to initially reduce TOC content. Effectiveness of the pre-treatment step is greatly enhanced due to the improved bacterial efficacy resulting from sodium sulfate removal. Subsequent to pre-treatment the waste water is subjected to denitrification followed by nitrification.

Waste water generated in cyclohexanone production is caustic and treatment therefore includes the additional step of acidifying the waste stream to a pH of 2. Acidification can be accomplished with the addition of concentrated sulfuric acid. Following acidification, the aqueous sodium sulfate phase is separated by extraction with the addition of triisooctylamine (TIOA). The aqueous phase is then treated for sodium sulfate removal, as described below.

The step of removing sodium sulfate from the waste streams resulting from production of polyethyleneimine and cyclohexanone, is accomplished by the addition of organic solvent to crystallize the sodium sulfate ($Na_2SO_4$). Sodium sulfate crystallization was found to occur at concentrations above 20% $Na_2SO_4$ in the waste water. Suitable solvents for $Na_2SO_4$ removal are miscible in aqueous solution at temperatures ranging from 20° C. to 100° C. Methanol, ethanol, isopropyl alcohol, acetone and monoethanolamine are useful solvents for this purpose. Preferably, methanol or ethanol is utilized as the solvent. The solvent is utilized in an amount between 20 and 70 weight %, based on the total weight of waste water and solvent. Preferably, solvent is utilized in an amount between 50 and 70 weight %. Generally, the higher the solvent concentration employed, the more sodium sulfate that is recovered. However, the use of higher solvent concentrations nearing the 70% range results in a less desirable, higher total organic carbon content in the effluent at the end of the treatment process.

The crystallization of sodium sulfate from the waste water is generally conducted at temperatures ranging from 25° to 100° C. Preferably, the crystallization temperature is between 40° and 80° C. The crystallization is conducted under slightly increased pressure when methanol is used, since the boiling point for methanol is 64° C. Sodium sulfate is recovered from solution by filtration. Preferably, a filter cloth of between 20 and 25 $\mu m$ is utilized. One or more filtrations may be employed for maximum recovery of the sodium sulfate.

The organic solvent is optionally removed from the waste water stream by distillation. Distillation is accomplished in a distillation tower. The optimum tower size is between 6 feet and 9 feet in diameter and 94 feet in height. The tower preferably contains a minimum of 42 trays and operates with a feed temperature of about 73° C. and an overhead temperature of between 60° C. and 66° C. The bottoms temperature is between 95° C. and 100° C. The minimum reflux ratio of 0.5 is utilized to obtain the overhead and bottoms concentration specifications. Preferably the reflux ratio is about 0.6.

FIG. 1 illustrates the removal of sodium sulfate from the waste water stream. In this process, the first step is the addition of waste water from holding tank 10 to a crystallizer 12, where the waste water is heated to a temperature of approximately 80° C. Methanol from reservoir 14 is then added to the waste water and the temperature is maintained at about 80° C. The crystallized sodium sulfate is fed into a centrifuge 16, where the sodium sulfate crystals are separated from the solvent and waste water mixture, by filtration. The sodium sulfate is then washed with either cold water or solvent, followed by drying in a dryer 24. The recovered sodium sulfate is then moved to a storage container 26. The solvent and waste water are then routed to the pre-treatment tank (not shown) or to a distillation tower 18, where the solvent is recovered by distillation. After distillation, the solvent passes through a cooling chamber 20 and is then pumped by recycle pump 22 to the methanol reservoir 14.

The waste water stream, at a reduced concentration of sodium sulfate, is pretreated, then blended with other waste waters for denitrification and nitrification stages.

The pre-treatment process employs carbon metabolizing bacteria to reduce the carbon concentration of the waste. During pre-treatment, the waste water is held in the pre-treatment tank for a period of between 21 and 24 hours.

The denitrification step employs bacteria that metabolize carbon to reduce total organic carbon content. In the process these bacteria utilize nitrates as a source of oxygen. Since the nitrate content is reduced in this step, it is identified as the "denitrification" step. Addition of air to the denitrification reactor is necessary to prevent sulfide formation. Air is also beneficial in increasing TOC removal. The flow rate of air is best controlled by measurement of redox potential of the reactor contents. The optimum operating range is between +10 and +25 millivolts. Lower potentials indicate a deficiency of air. Optimum pH for denitrification is 7.5 to 8.0. Optimum temperature for denitrification is between 25° C. and 30° C. A high solids content of between 3000 and 3500 mg/l volatile solids is utilized for denitrification. Denitrification requires holding the waste water in a denitrification reactor for a period of about 24 hours.

Nitrification is an aerobic process which reduces the total organic carbon content and the nitrogen content of the waste water. This is accomplished by using bacteria that metabolize nitrogen. Bacteria make up 10% to 15% of the total waste water composition. In nitrification, ammonia is removed from the waste water by bacterial oxidation of ammonia to nitrate ($NO_3^-$). Atmospheric oxygen is used as the oxidizing agent. The sequence of intermediates is:

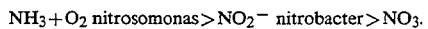

$NH_3 + O_2$ nitrosomonas > $NO_2^-$ nitrobacter > $NO_3$.

Successful nitrification is indicated by $N-NH_3$ levels of below 1.0 mg N/L.

Optimum pH for nitrification is between 7.2 and 7.7. Optimum temperature is between 25° C. and 30° C. A solids content of between 1500 and 2500 mg/l volatile solids is utilized for nitrification. The nitrification residence time is greatly reduced by pre-treatment of the sodium sulfate reduced polyethyleneimine waste water. Without removal of sodium sulfate from the waste water, pre-treatment residence time ranged from 40 to 70 hours, with an average residence time of about 48 hours. The process of the present invention reduces nitrification residence time to 24 hours.

Figure 2:
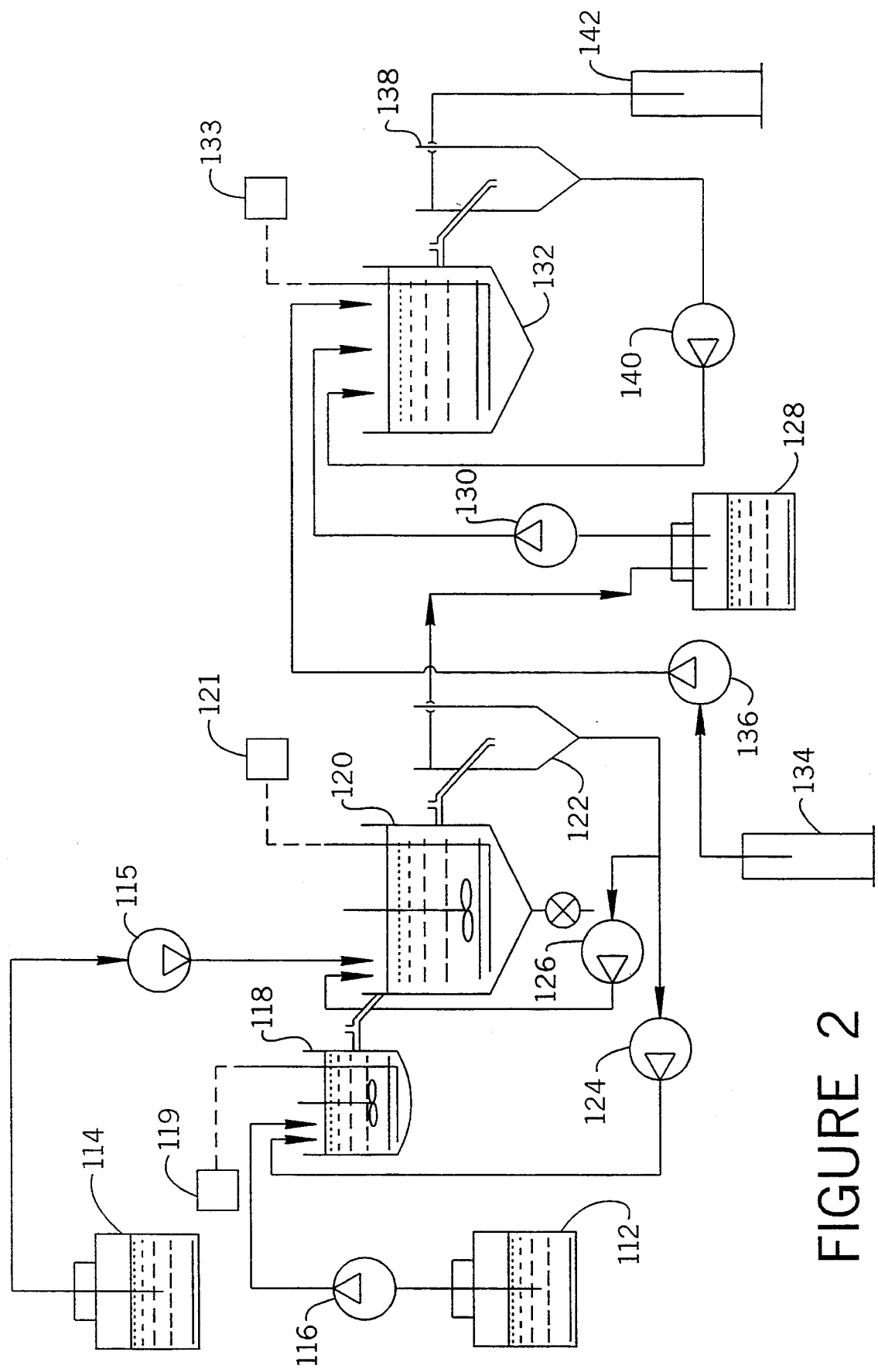
FIG. 2 illustrates the treatment of the waste water having reduced sodium sulfate content.

FIG. 2 illustrates the process for denitrification and nitrification of waste water having a reduced sodium sulfate concentration. After sodium sulfate removal, waste water is directed to a pre-treatment reservoir 112, or to a denitrification reservoir 114. Water from the denitrification reservoir 114 is fed directly to the denitrification reactor 120, via pump 115 and held there for 24 hours. Air is supplied to the denitrification reactor by an aerator 119. Waste water for pre-treatment is fed by feed pump 116 to a pre-treatment reactor 118 and held in the reactor between 21 and 24 hours. Air is supplied to the pre-treatment reactor by an aerator 121. The pre-treated waste water flows to denitrification reactor 120, where it is combined with waste water from the denitrification reservoir. The combined waste water is held in the denitrification reactor 120 for a period of about 24 hours.

Next, as shown in FIG. 2, the waste water flows by gravity to the denitrification clarifier 122. The clarifier 122 separates the carbon metabolizing bacteria from the waste water, so that the bacteria can be reused. The bacteria settle to the bottom of the clarifier 122, and are removed and recycled by pump 126, back to the denitrification reactor 120. The waste water flows by gravity into a nitrification holding tank 128. From the holding tank 128, the water is pumped by pump 130 to a nitrification reactor 132.

In the nitrification reactor 132, nitrogen is removed using nitrogen metabolizing bacteria. The process is aerobic and uses atmospheric oxygen as an oxidizing agent to oxidize ammonia to nitrate. An aerator 133 supplies air to the nitrification reactor 132. The waste water is held in the nitrification reactor between 24 and 57 hours. For purposes of adjusting the pH in the nitrification reactor, a reservoir for hydrochloric acid 134 supplies acid to the nitrification reactor 132. Acid is pumped from the reservoir 134 to the reactor 132 by pump 136.

After nitrification, the water then flows by gravity to a nitrification clarifier 138, where the nitrogen metabolizing bacteria are separated from the waste water. The bacteria settle to the bottom of the clarifier 138 and are removed and recycled back to the nitrification reactor 132 by recycle pump 140. The waste water flows by gravity into an effluent reservoir 142.

As shown by the following examples, high concentrations of sodium sulfate in waste water significantly hinder the ability of a waste treatment system to maintain consistently low final effluent TOC levels (approximately 100 mg/L) when running with a reduced nitrification treatment time of 24 hours. The examples show that reducing the sodium sulfate content of waste water allows for a shortened nitrification time and provides a lower, more consistent final effluent TOC concentration. The examples also show that pre-treatment of reduced sodium sulfate waste water provides lower, more consistent final effluent TOC concentration, than does treatment in a two sludge system utilizing only denitrification and nitrification.

The advantageous practical effect of the process of the present invention is, that the flow of waste water is significantly increased, thereby increasing the volume of water that can be processed in a given time, or alternatively, allowing smaller tanks to be used to process the same amount of waste water.

For a more complete understanding of the present invention, reference is made to the following non-limiting examples.

EXAMPLES

Examples 1-5

Sodium Sulfate Recovery for Polyethyleneimine Waste Water

Examples 1-3 were prepared with varying amounts of solvent. Preparation of the examples was as follows.

Waste water generated from polyethyleneimine production was weighed and then heated with stirring in a crystallizer. Solvent was weighed and added to the crystallizer. Examples 1-3 contained 50, 60 and 70 weight percent methanol respectively, based on total weight of waste water and solvent. The salt was then removed from the solution by filtration. Following filtration, the salt was washed and dried. The solvent was recovered by distillation.

Examples 4 and 5 were prepared as above, except that ethanol and methanolamine respectively, were used as solvents in an amount of 60 weight percent based on total weight of solvent and waste water.

Tables 1-3 set forth results for the effect of variations in solvent, solvent concentrations and temperatures.

TABLE 1

Effect of Variations in Solvent and Solvent Concentration on Final Polyethyleneimine Waste Water

| Example | % Solvent | % TOC in $Na_2SO_4$ | % Na in Final Effluent | % Na in Solvent/Water | % $Na_2SO_4$ in Final Effluent |
|---|---|---|---|---|---|
| 1 | 50% MeOH* | 0.46 | 0.4 | 0.2 | 1.23 |
| 2 | 60% MeOH | 0.50 | 0.2 | 0.081 | 0.62 |
| 3 | 70% MeOH | 0.53 | 0.1 | 0.029 | 0.31 |
| 4 | 50% EtOH** | 1.12 | 0.45 | 0.23 | 1.35 |
| 5 | 50% MEA** | — | 0.35 | 0.18 | — |

*MeOH is methanol
**EtOH is ethanol
***MEA is methanolamine

TABLE 2

Effect of MeOH Concentration and Temperature on Final Sodium Content of Polyethyleneimine Waste Water

| | | % Na In Final Effluent At Various Treatment Temperature | | | |
|---|---|---|---|---|---|
| Example | % MeOH | 25° | 40° | 60° | 80° |
| 1 | 50 | 0.202 | 0.212 | 0.221 | 0.242 |
| 2 | 60 | 0.074 | 0.07 | 0.084 | 0.08 |
| 3 | 70 | 0.027 | 0.029 | 0.029 | 0.024 |

TABLE 3

Effect of MeOH Concentration and Temperature on TOC Content of $Na_2SO_4$ Crystals

| | | % TOC in Sodium Sulfate Crystals at Varying Temperatures | | |
|---|---|---|---|---|
| Example | % MeOH | 40° C. | 60° C. | 80° C. |
| 1 | 50 | 0.66 | 0.51 | 0.36 |
| 2 | 60 | 0.51 | 0.49 | 0.41 |
| 3 | 70 | 0.58 | 0.39 | 0.43 |

EXAMPLE 6

Recovery of Sodium Sulfate from Cyclohexanone Caustic Waste Water Streams

The cyclohexanone waste water was acidified with the addition of concentrated sulfuric acid, to a pH of 2. The aqueous sodium sulfate phase was separated by extraction with the addition of triisooctylamine (TIOA). The aqueous phase was then mixed with a solvent for sodium sulfate precipitation, as described above for the polyethyleneimine waste water. In examples 6a-c, the solvent was methanol (MeOH), in amounts of 50 wt. %, 60 wt. %, and 70 wt. %, respectively, based on total weight of solvent and waste water. In example 6d the solvent was ethanol (EtOH) and in example 6e the solvent was methanolamine. TOC level was measured in the recovered salt. The waste water was treated at a temperature of 40° C.

TABLE 4

Total Organic Carbon Content of Treated Cyclohexanone Waste Water With $Na_2SO_4$ Removal

| | | | % TOC* in $Na_2SO_4$ Crystals | |
|---|---|---|---|---|
| Example | Solvent | % Solvent | pH = 2 | pH = 4 |
| 6a | MeOH | 50 | — | 1.15 |
| 6b | MeOH | 60 | 0.28 | 1.12 |
| 6c | MeOH | 70 | — | 0.88 |
| 6d | EtOH | 60 | 0.25 | 1.44 |
| 6e | MEA | 60 | 1.0 | — |

EXAMPLE 7

Comparative Results of Treated Waste Water With and Without Sodium Sulfate Removal The following tests were run to determine the effects of sodium sulfate removal from waste water on the final effluent content of nitrogen and total organic carbon (TOC). In all tests the residence time in the denitrification reactor was 24 hours. In all tests the feed composition was 94.3% non-polyethyleneimine waste water 0.25% polyethyleneimine filter wash water 1.27% polyethyleneimine reactor wash water and 4.2% polyethyleneimine process waste water. The tests were conducted as follows.

Test 1

This test was run for seven (7) days and did not utilize waste water with reduced sodium sulfate concentration. Feed consisted of normal plant polyethyleneimine waste water. Due to a mechanical failure, good nitrification was not obtained. The test was concluded on day 7 and both reactors were drained.

Test 2

This test was run for 20 days. The pH of the nitrification reactor was controlled at 7.75. Waste water containing 1% sodium sulfate was introduced into the system on day 3. Black sludge appeared on day 13 indicating that the sulfate was being chemically reduced in the denitrification reactor due to very low redox potential. The system was taken off reduced sodium sulfate waste water on day 17. The system was taken off all polyethyleneimine on day 18 because high final effluent N-NH$_3$ concentration indicated that nitrification activity had ceased. Changes in feed composition related to production unit shutdowns may have caused the failure. Both reactors were drained due to nitrification failure and the test was concluded on day 20.

Test 3

The test was run for 36 days and utilized waste water having a reduced sodium sulfate concentration. The pH of the nitrification reactor was controlled at 7.75. Nitrification residence time was 57 hours. A N-NH$_3$ spike in the final effluent occurred on day 6 during a loss of excess inorganic carbon in the final effluent and a drop in pH below 7.00 in the nitrification reactor. The inorganic carbon and pH recovered by day 31, but the system had already started toward nitrification failure. The nitrification reactor was drained on day 36 and the test was concluded.

Test 4

The test was run for 31 days and utilized waste water having a reduced sodium sulfate concentration. Denitrification residence time was 43 hours. The pH was maintained at 7.75. A loss of excess inorganic carbon caused the pH in the nitrification reactor to drop and the final effluent N-NH$_3$ level to rise. A daily 50 ppm excess of sodium bicarbonate was added to the nitrification reactor to provide a constant buffer system. Both pH and inorganic carbon levels recovered in the nitrification reactor. The residence time in the nitrification reactor was increased to 57 hours on day 14, when final effluent N-NH$_3$ levels did not drop. The residence time was reduced to 48 hours on day 31 after the N-NH$_3$ levels in the final effluent stabilized below 1.00 mg N/L.

Tests 5-11

Tests 5-11 were an extension of test 4. The tests were conducted over a 6 month period, each test representing one month of time. The reactors were not drained. In test 5, nitrification residence time was reduced to 43 hours despite increasing N-NH$_3$ concentrations in the final effluent. It was found that nitrification would recover independently after 3-6 weeks at nitrification residence time of 48 hours. As a result of this finding, in test 5, nitrification residence time was increased to 48 hours on day 12 and held there throughout Test 6 and for two weeks during test 7, for a total of about 6 weeks. After this time Effluent NH$_3$ returned to normal.

Test 8

During test 8 residence time in nitrification reactor was reduced to 32 hours on day 17 and held there through day 31 with no significant increase in NH$_3$ or TOC.

Test 9

On day 1, residence time in the nitrification reactor was reduced to 24 hours. A pH upset occurred on day 2. The reactor was reseeded, nitrification residence time was increased to 42 hours for days 9-22. NH$_3$ levels returned to normal on day 19. 24 hour nitrification residence time was resumed on day 21.

Test 10

Residence time of 24 hours was maintained throughout this test. NH$_3$ levels remained acceptable. TOC levels rose during this test and on day 31 sodium sulfate reduction was stopped.

Test 11

Nitrification reactor residence time of 24 hours was maintained throughout this test. Addition of reduced sodium sulfate waste water was halted and replaced by high sodium sulfate content (23%) waste water through the end of testing. Final effluent TOC levels increased over those of test 10. NH$_3$ levels rose above 1.0 mg N/L.

TABLE 5

Comparative Results of Treated Waste Water With and Without Sodium Sulfate Removal

| Test | Na$_2$SO$_4$ Removal | Nitrification Residence Time (hours) | Final Effluent TOC (mg/L)/ No of Days* | | | | Final Effluent N—NH$_3$ mg N/L per No. of Days** | | | |
|---|---|---|---|---|---|---|---|---|---|---|
| | | | 5 | 10 | 15 | 20 | 5 | 10 | 15 | 20 |
| 1 | no | 57 | 65 | — | — | — | 35 | — | — | — |
| 2 | no | 57 | 70 | 130 | 125 | — | 0 | 0 | 15 | 80 |
| 3 | yes | 57 | 70 | 135 | 125 | — | 0 | 0 | 0 | 20 |
| 4 | yes | 43 | 85 | 90 | 90 | 105 | 5 | 35 | 30 | 10 |
| 5 | yes | 43 | 95 | 85 | 60 | 80 | 0 | 0 | 0 | 5 |
| 6 | yes | 48 | 90 | 100 | 105 | 110 | 105 | 105 | 110 | 115 |

TABLE 5-continued

Comparative Results of Treated Waste Water With and Without Sodium Sulfate Removal

| Test | Na$_2$SO$_4$ Removal | Nitrification Residence Time (hours) | Final Effluent TOC (mg/L)/ No of Days* | | | | Final Effluent N—NH$_3$ mg N/L per No. of Days** | | | |
|---|---|---|---|---|---|---|---|---|---|---|
| | | | 5 | 10 | 15 | 20 | 5 | 10 | 15 | 20 |
| 7 | yes | 40 | 110 | 90 | 100 | 100 | 60 | 40 | 0 | 60 |
| 8 | yes | 32 | 70 | 75 | 85 | 80 | 0 | 0 | 10 | 0 |
| 9 | yes | 24 | 105 | 90 | 100 | 95 | 80 | 50 | 40 | 0 |
| 10 | yes | 24 | 100 | 120 | 160 | 110 | 0 | 0 | 0 | 0 |
| 11 | no | 24 | 105 | 130 | 180 | *** | 0 | 0 | 0 | *** |

*acceptable levels are <100 mg/L
**acceptable levels are <1.0 mg N/L
***testing halted on day 19.

We claim:

1. A process for treatment of waste water streams having a concentration of above 20% sodium sulfate, including the steps of
   a) removing sodium sulfate from waste water in the form of crystals, by the addition of organic solvent, wherein said solvent is miscible in aqueous solution at temperatures between 20° C. and 110° C.,
   b) biological pre-treatment with activated sludge
   c) denitrification with activated sludge and
   d) nitrification with activated sludge.

2. The process of claim 1, wherein the organic solvent is selected from the group consisting of methanol, ethanol isopropyl alcohol, acetone and monoethanolamine.

3. The process of claim 1, wherein the solvent is utilized in an amount between 20 and 70 weight percent, based on the total weight of waste water and solvent.

4. The process of claim 1, wherein the crystallization of sodium sulfate from the waste water is conducted at temperatures ranging from 40° C. to 80° C.

5. The process of claim 1, wherein the pre-treatment time is between 21 and 24 hours.

6. The process of claim 1, wherein denitrification residence time is 24 hours.

7. The process of claim 1, wherein denitrification is conducted at a temperature of between 25° C. and 30° C.

8. The process of claim 1, wherein denitrification is conducted at a pH of between 7.5 and 8.0.

9. The process of claim 1, wherein nitrification residence time is 24 hours.

10. The process of claim 1, wherein nitrification includes bacterial treatment with nitrosomonas and nitrobacter organisms.

11. The process of claim 1, wherein nitrification is conducted at a temperature of between 25° C. and 30° C.

12. The process of claim 1, wherein nitrification is conducted at a pH of between 7.2 and 7.7.

13. The process of claim 1, wherein the waste water stream contains compounds selected from the group consisting of polyethyleneimime and cyclohexanone, by products from production of polyethyleneimime and cyclohexanone and mixtures thereof.

14. The process of claim 13, wherein the waste water stream contains cyclohexanone, by products from production of cyclohexanone and mixtures thereof, wherein the process further comprises the step of acidifying the waste water to a pH of 2, prior to removal of sodium sulfate.

15. The process of claim 14, wherein the waste water is acidified with concentrated sulfuric acid.

16. The process of claim 14, further comprising the step of extracting an aqueous sodium sulfate phase by the addition of triisooctylamine, prior to removal of sodium sulfate.

* * * * *